(12) United States Patent
Henrichsen et al.

(10) Patent No.: US 6,860,917 B2
(45) Date of Patent: Mar. 1, 2005

(54) MELT-SPUN CERAMIC FIBER FILTER AND METHOD

(75) Inventors: Matthew P. Henrichsen, Evansville, WI (US); William C. Haberkamp, Cookeville, TN (US); Gene A. Mullins, Jr., Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 10/308,586

(22) Filed: Dec. 3, 2002

(65) Prior Publication Data

US 2003/0101701 A1 Jun. 5, 2003

Related U.S. Application Data

(60) Provisional application No. 60/336,640, filed on Dec. 4, 2001.

(51) Int. Cl.[7] .............................................. B01D 39/20
(52) U.S. Cl. ..................... 55/523; 55/521; 55/DIG. 5; 264/5; 264/112; 264/113; 264/165; 264/624; 264/628; 264/DIG. 48; 156/62.8
(58) Field of Search ...................... 55/486, 487, 520, 55/521, 523, DIG. 5, DIG. 30; 501/1, 87, 88, 91, 92, 94, 96.4, 97.1; 264/5, 6, 8, 112, 113, 165, DIG. 48, 624, 625, 626, 627, 628, 682; 156/62.8

(56) References Cited

U.S. PATENT DOCUMENTS

| | | | |
|---|---|---|---|
| 3,308,853 A | | 3/1967 | O'Brien |
| 3,595,245 A | | 7/1971 | Buntin et al. |
| 3,615,995 A | | 10/1971 | Buntin et al. |
| 3,650,866 A | | 3/1972 | Prentice |
| 3,676,242 A | | 7/1972 | Prentice |
| 3,684,415 A | | 8/1972 | Buntin et al. |
| 3,715,251 A | | 2/1973 | Prentice |
| 3,755,527 A | | 8/1973 | Keller et al. |
| 3,849,241 A | | 11/1974 | Butin et al. |
| 3,978,185 A | | 8/1976 | Buntin et al. |
| 4,000,967 A | | 1/1977 | Johnson et al. |
| 4,078,124 A | | 3/1978 | Prentice |
| 4,238,175 A | | 12/1980 | Fujii et al. |
| 4,652,286 A | * | 3/1987 | Kusuda et al. ............... 55/523 |
| 4,657,991 A | | 4/1987 | Takamizawa et al. |
| 4,714,647 A | | 12/1987 | Shipp, Jr. et al. |
| 4,898,634 A | * | 2/1990 | Keuchel ..................... 264/8 |
| 4,946,919 A | * | 8/1990 | Johnson ....................... 528/4 |
| 4,954,596 A | * | 9/1990 | Takeda et al. ............... 528/14 |
| 5,292,830 A | | 3/1994 | Funayama et al. |
| 5,322,822 A | * | 6/1994 | Seguchi et al. ............ 501/88 |
| 5,497,620 A | | 3/1996 | Stobbe |
| 5,611,832 A | | 3/1997 | Suzuki et al. |
| 5,651,250 A | | 7/1997 | Kawamura |
| 5,655,212 A | | 8/1997 | Sekhar et al. |
| 5,667,562 A | * | 9/1997 | Midkiff ...................... 55/486 |
| 5,780,126 A | | 7/1998 | Smith et al. |
| 5,809,777 A | | 9/1998 | Kawamura |
| 5,820,645 A | * | 10/1998 | Murphy, Jr. ................ 55/521 |
| 5,872,070 A | * | 2/1999 | Dismukes et al. ........... 501/88 |
| 6,001,530 A | * | 12/1999 | Kidnie et al. ............... 430/201 |
| 6,444,006 B1 | | 9/2002 | Haberkamp et al. |

* cited by examiner

*Primary Examiner*—Duane Smith
*Assistant Examiner*—Jason M. Greene
(74) *Attorney, Agent, or Firm*—Andrus, Sceales, Starke & Sawall, LLP

(57) ABSTRACT

A method for making high temperature filter media is provided by melt-spinning a plurality of fibers of preceramic thermoplastic polymer to form a nonwoven textile web of the fibers, curing and cross-linking the thermoplastic polymer to a thermoset polymer, and thermally decomposing the thermoset polymer to ceramic. Between the melt-spinning step and the curing step, the web is formed to a filter pre-form in a green state while still pliable and malleable. The filter pre-form is cured without re-melting the thermoplastic polymer and without destroying morphology.

10 Claims, 2 Drawing Sheets

MELT-SPUN CERAMIC FIBER FILTER AND METHOD

CROSS-REFERENCE TO RELATED APPLICATIONS

This application claims priority from provisional U.S. patent application Ser. No. 60/336,640, filed Dec. 4, 2001.

BACKGROUND AND SUMMARY

The invention relates to a high temperature filter, including a diesel engine exhaust filter, and to a method for making same.

As regulatory agencies continue to mandate reduction of particulate emissions from diesel engines, there has been increased activity in the development of exhaust gas filters for diesel engines. A typical exhaust filter will trap the particulate material contained in the exhaust stream, and to prevent clogging filter and the resultant increase of load on the engine due to increased back pressure, the particulate material is burned or incinerated from the filter, i.e. the filter is regenerated. A diesel engine exhaust filter must have high temperature resistance and durability, and it has been proposed to use ceramic materials as the filter media, for example U.S. Pat. Nos. 4,017,347, 4,652,286, 5,322,537, 6,444,006, incorporated herein by reference.

The present invention arose during continuing development efforts directed toward high temperature filters, including for diesel exhaust. In a particularly desirable aspect, the invention enables shaping and forming of the filter while in a malleable green pre-form state, prior to rigidization. In another desirable aspect, the filter provides lower back pressure, for improved performance.

DETAILED DESCRIPTION

Parent Provisional Application

Figure 1:
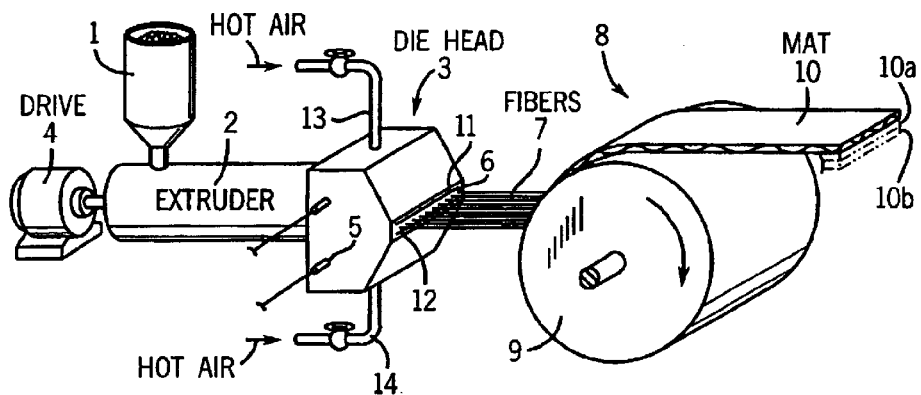
FIG. 1 is a schematic perspective view of a melt-blowing process.

The present application claims priority from provisional U.S. patent application Ser. No. 60/336,640, filed Dec. 4, 2001, incorporated herein by reference, and set forth herein below.

Extruded ceramic monolith diesel particulate filters have limited temperature resistance and have higher back pressure than fiber filters. Fiber filters made from a ceramic based paper perform better (i.e. lower back pressure), but require a binder phase which can be difficult to apply and expensive.

Using a melt-blown preceramic fiber allows manipulation and bonding of the ceramic form while in a more malleable preceramic thermoplastic polymer form. As a thermoplastic, heat can be used to bond the fibers together and to aid in shaping the media into a filter. The media can be formed using a process similar to ones currently employed in the prior art with conventional thermoplastic polymers. The polymer can be cured (cross-linked) into a thermoset polymer before thermal decomposition from polymer to ceramic. Possible curing processes include steam curing of silane groups and UV or visible light curing of allyl groups, among others. Additives (as a component in a mixture, as a copolymer, or as a functional group on the polymer) might be used to enable or enhance curing below the melting point. Additionally the preceramic polymer may be used for any bonding, sealing or reinforcement when producing a fabricated part. Conversion to a thermoset will reduce or eliminate deformation during decomposition to a ceramic (e.g. slumping, melting, sintering, etc.). The resulting filters will be homogenous in composition not needing binders added, and the temperature limit can be 1500° C. or higher, depending on the composition of the ceramic material produced.

The disclosure is the use of a thermoplastic preceramic polymer capable of being formed into a textile like web using a melt-blown or spun-bonding process. The polymer web is then cured (cross-linked) to a thermoset state and finally processed to its ceramic form pyrolyzing and/or calcining at an elevated temperature above its intended use. Polymers that might be used or modified for use in this manner include but are not limited to polycarbosilane (PCS), hydridopolycarbosilane (HPCS), polysilazane, polyureasilazane (Ceraset, KiON AL20, KiON AS20), polycarboxysilane, and variations on these. In addition, the invention is the use of a nonwoven preceramic polymer or ceramic textile made in this manner to form a filter or catalyst substrate for use, for example, in reducing emissions from an internal combustion engine.

Web Forming

Filter materials formed of near continuous fiber are produced from thermoplastic preceramic polymers into self-bonded webs using melt-blowing or spun-bonding processes. The most simple description is that molten polymer is extruded through fine holes and drawn to a desired diameter range with air as it simultaneously cools and bonds to itself against a forming surface. Single or multiple layers of such webs may also be thermally processed to enhance the degree of bonding between individual fibers or layers. A potential advantage of using various layers is that each may be designed with differing fiber diameters and fiber density to improve either the filtration or mechanical properties of the web. Melt blowing in particular offers the means of producing these variations from a single die or multiple die system while manipulating the properties of the fibers and web.

Structure Forming

A suitable thermoplastic web of preceramic polymer may be converted into complex shapes or structures suitable for filtration or catalyst support using available processes. One advantage of thermoplastic material is the ability to bond to itself without the need of additional material or resins. Either thermal or ultrasonic bonding techniques would be suitable and if needed, additional preceramic material may be used to aid in fabrication of three-dimensional structures or as fillers, sealant, separators or other structural enhancements prior to curing. Using techniques such as pleating or corrugating, webs could be formed into a spiral wound or other filter form before decomposition or before cross-linking when the fibers are still pliable and easily shaped.

Curing and Conversion

The web or three dimensional structure can be cured (i.e. cross-linked) to a thermoset polymer using optical, chemical, or thermal initiation, depending on the composition and cross-linkable components in the polymer, copolymer, or additives. After thermosetting, the polymer could be heated until it decomposed to a ceramic without destroying the fibrous nature of the material. A polycarbosilane-type polymer would produce silicon carbide or other silicon based polymers are available to produce silicon nitride, silicon oxycarbide silicon nitride-carbide. Potentially other metal oxide polymers could be produced so that the list is not limited to silicon based ceramics. Typically the final thermal processing is accomplished in inert or reducing atmosphere above the expected use of the final material and a final firing or calcining may be required depending on the ceramic phase desired.

Final Part

With the methods described it would be possible to produce a fibrous filter or catalyst support structure that is self-supporting and entirely homogeneous in nature. A single preceramic material may be used for the fabrication of a fiber web, subsequent processing/pleating/laminating/bonding or scaling, and finally cured and processed to a stable ceramic material. The final ceramic structure will cured and processed to a stable ceramic material. The final ceramic structure will posses the properties of the selected ceramic material in a form and structure more beneficial and useful than that which might otherwise be obtained with current ceramic production methods.

PRESENT APPLICATION

A portion of FIG. 1 is taken from U.S. Pat. No. 3,755,527, incorporated herein by reference, and like reference numerals are used to facilitate understanding. A preceramic thermoplastic polymer is introduced into a pellet hopper 1 of an extruder 2. The thermoplastic polymer is forced through the extruder 2 into a die head 3 by a drive 4. The die head 3 may contain heating means 5 which may control the temperature in the die head 3. The thermoplastic polymer is then forced out of a row of die openings, also known as spinnerets, in the die head 3 into a gas stream which attenuates the thermoplastic polymer into fibers 7 which are collected on a moving collecting device 8 such as a drum 9 to form a continuous web or mat 10. The gas stream which attenuates the thermoplastic polymer is supplied through gas jets 11 and 12, for which further reference may be had to FIG. 2 of the incorporated '527 patent. The gas slots 11 and 12 are supplied with a hot gas, preferably air, by gas lines 13 and 14. Reference is also made to U.S. Pat. No. 3,978,185, incorporated herein by reference, for showing a melt-blowing process. Other types of melt-spinning processes can be used, for example spun-bonding.

Figure 2:
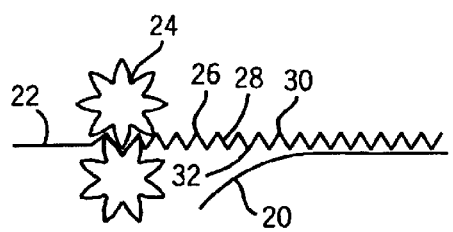
FIG. 2 is a schematic view of further processing of the web or mat of FIG. 1.
Figure 3:
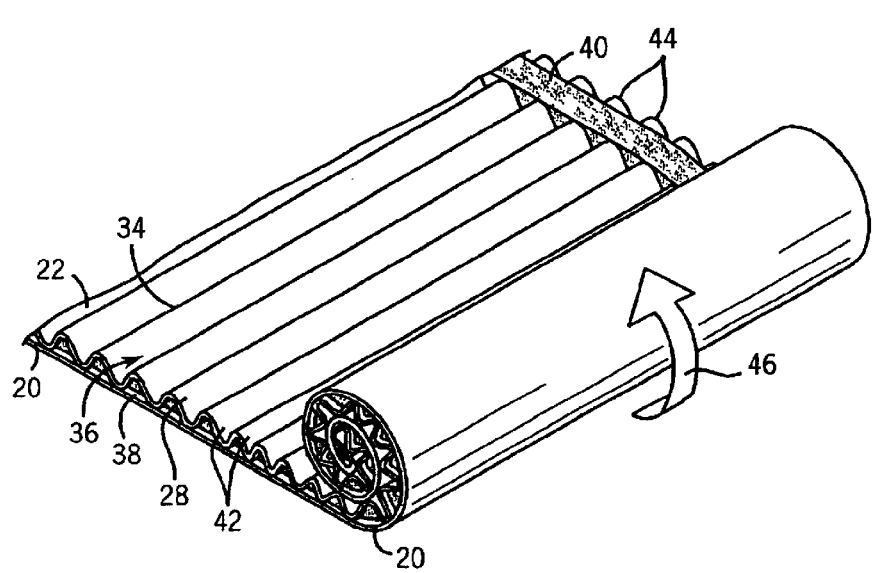
FIG. 3 illustrates spiral-winding of the sheets of FIG. 2.
Figure 4:
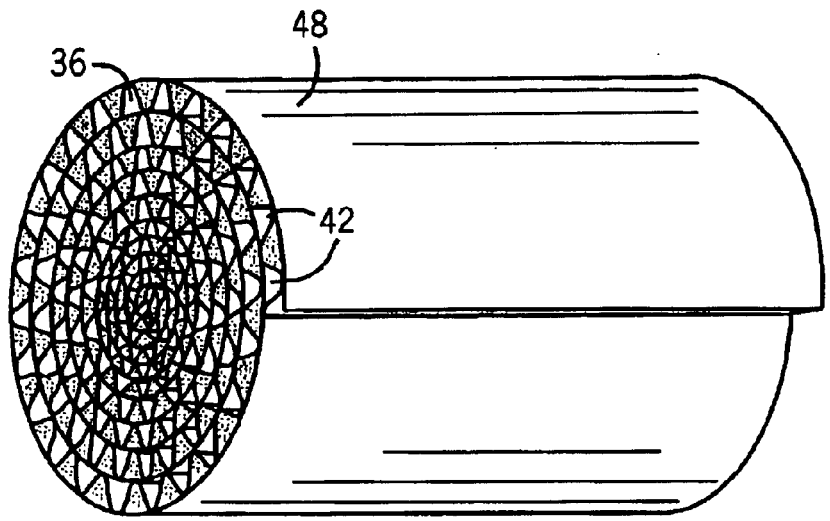
FIG. 4 schematically shows a spiral-wound cylindrical filter.

Web or mat 10 is cut into sheets such as 20, 22, FIGS. 2–4, and formed to a desired filter construction. For example, sheet 22 is fed through pleater 24 to form a plurality of pleats 26 defined by wall segments 28 extending in zig-zag manner between pleat tips 30, 32 at axially extending bend lines 34. The pleat tips on one side of sheet 22, for example pleat tips 32, are in contiguous relation with and preferably adhesively bonded to sheet 20 to define axial flow channels 36. Opposite ends of alternate channels may be sealed with high temperature plug material 38, 40, to provide a wall-flow filter, as is known, wherein exhaust enters alternate open upstream ends 42 of the channels and then must flow through the filter media wall segments 28 to reach the alternate open downstream ends 44 of the channels. In open-flow type filters, sealant plugs 38 and 40 are eliminated, and all channels are open at both their upstream and downstream ends.

Figure 5:
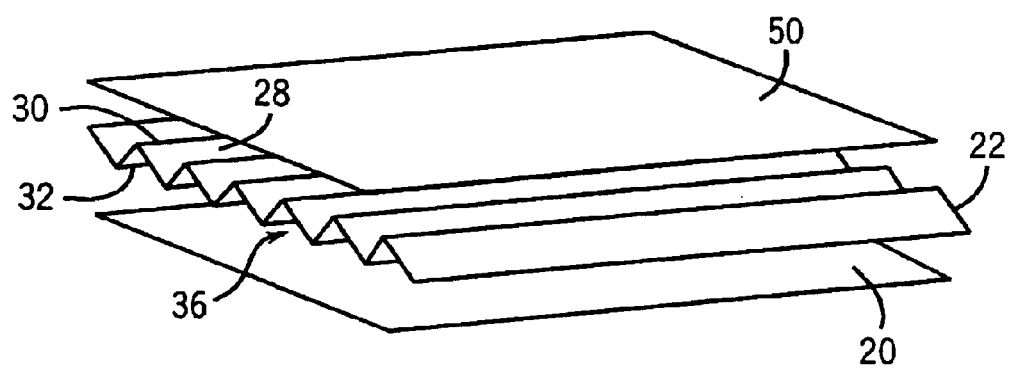
FIG. 5 shows an alternate filter construction.

The laminated sheets 20, 22 may be spiral-wound as shown at arrow 46 in FIG. 3, with upper pleat tips 30 preferably having adhesive applied thereto, to yield spiral-wound cylindrical filter 48, FIG. 4. Alternatively, a second planar filter media sheet 50, FIG. 5, may be cut from web or mat 10, and corrugated or pleated sheet 22 is sandwiched between planar sheets 20 and 50. The structure of FIG. 5 may be repeated in stacked manner to provide multiple layers, with or without sheet 50.

The present invention provides a method for making high temperature filter media for providing sheet 20 and/or sheet 22 and/or sheet 50. The method involves melt-spinning (e.g. melt-blowing or spun-bonding) a plurality of fibers 7 of preceramic thermoplastic polymer to form a nonwoven textile web or mat 10 of the fibers, curing and cross-linking the thermoplastic polymer to a thermoset polymer, and thermally decomposing (e.g. pyrolyzing or calcining) the thermoset polymer to ceramic. The fibers are bonded together in the web. The fibers are preferably bonded together without an additional binder. The fibers are preferably thermally bonded together, preferably heat-bonding the fibers together during the melt-spinning step, e.g. during melt-blown processing or spun-bond processing. An alternative involves heat-bonding the fibers together in a separate subsequent step following the melt-spinning step and prior to the noted curing step. In another alternative, the fibers are ultrasonically bonded together.

Various types of curing may be used. In one embodiment, the fibers are photo-optically cured, for example by ultraviolet curing of allyl groups, or visible light curing of allyl groups. In another embodiment, the fibers are chemically cured, for example by steam curing of silane groups. In another embodiment, the fibers are thermally cured at a temperature>150° C. In another embodiment, the fibers are cured by electron beam curing. The fibers should be cured without re-melting the thermoplastic polymer and without destroying morphology. An additive may be provided in the thermoplastic polymer to facilitate curing below the melting point, i.e. so that the curing step may be performed below the melting point of the fibers.

After curing of the thermoplastic polymer to a thermoset polymer, the thermoset polymer is thermally decomposed to ceramic, for example by pyrolization or by calcination, for example in an inert or non-oxidizing atmosphere, e.g. nitrogen, at a temperature>900° C., e.g. 900° C. to 1100° C., for which further reference may be had to above noted incorporated U.S. Pat. No. 6,444,006. The rigidization provided by the curing step conversion to the thermoset polymer minimizes deformation during the decomposition step to ceramic.

The thermoplastic polymer is preferably selected from the group consisting of: polycarbosilane, PCS; a hydridopolycarbosilane, HPCS; polysilazane; polyureasilazane, including Ceraset, KiOn, AL20, KiOn, AS20; and polycarboxysilane. Prior to the curing step, the web or mat 10 as cut into sheets 20 and 22 is formed to the desired filter structure, e.g. FIGS. 2–5, while still malleable thermoplastic, prior to curing to a thermoset polymer. Between the melt-spinning step and the curing step, the web is formed to a filter pre-form in a green state, the green state pre-form being pliable and malleable to facilitate the forming. A further alternative involves heating the web for the noted forming step to enhance malleability thereof.

The thermoplastic polymeric resin is extruded in molten form through the row of die openings or spinnerets 6 in die head 3 into a converging stream of hot gas emerging from gas slots 11, 12 immediately above and below the row of die openings. The hot gas is moved at rates relative to the rate of polymer flow which attenuate the polymer into fibers having a diameter in the range of about 1 to 40 microns, and further preferably in the range of 1 to 20 microns. The fibers, which are attenuated essentially in a plane away from the die openings, are collected as a nonwoven mat or web on a continuously moving surface 9 positioned about 5 to 45 cm from the die openings 6 of die head 3. The nonwoven mat or web is formed of preceramic polymeric material. Smooth molten flow of the polymer is required and is achieved through control of the resin flow rate and die tip temperature which control the viscosity in the die. The control of both air flow and temperature will achieve the required fiber attenuation which yield the desired fiber diameter. Quenching of the molten fiber stream is accomplished by entrained ambient air which joins the fiber and hot air stream as the polymer is nearing and then collecting on the moving surface. This ambient air can alternatively be controlled to a desired temperature or refrigerated. Properties of the base polymer such as its melting point, molecular weight and molten viscosity will determine these desired settings. Once collected in a nonwoven mat, the preceramic polymer web can be processed into more complex shapes by thermally forming the material near its softening point but below the melting point. Bonding of layers or joints can be accomplished with ultrasonic or heating methods as desired or with the application of additional molten polymer similar to a hot melt glue gun. This will preserve the morphology of the fibers in the article and allow for joining or fastening as needed. It is significant that fiber diameter and morphology be maintained. If there is a change in diameter during final processing, such as shrinkage, this can be adjusted during initial processing by altering the melt-blowing process condition so that a desired morphology is achieved. The final article is processed to yield a thermally stable ceramic media. Once in a suitable shape the nonwoven material is cured without re-melting the structure, continuing to preserve the morphology of the web. This is accomplished as above described, for example by ultraviolet or blue light, chemical or free radical initiation, or electron beam curing which would maintain the web below its melting point but fully cure or cross-link the material. The final state is then achieved by decomposition to a thermally stable ceramic through pyrolysis or calcination in a controlled atmosphere as above described.

In further embodiments, multiple layers of webs of melt-spun preceramic fibers are provided. For example, after formation of mat 10, it is layered with other similarly formed mats such as 10a, 10b, etc., as shown in phantom in FIG. 1, to provide multiple layers of webs. In a further embodiment, at least two of the layers, and preferably each of the layers, have a different fiber diameter from each other to form a gradient structure to enhance the filtration performance of the combination and/or improve the structural integrity of the resulting high temperature medium. Layers 10, 10a, 10b, etc. are preferably bonded together without a binder, by the same techniques noted above (for example, thermal, ultrasonic, or an additional polymer) prior to fabrication of the final part shape.

It is recognized that various equivalents, alternatives and modifications are possible within the scope of the appended claims.

What is claimed is:

1. A high temperature composite ceramic filter comprising first and second sheets, said second sheet having a plurality of pleats defined by wall segments extending in zig-zag manner between pleat tips at axially extending bend lines, the pleat tips on one side of said second sheet being in contiguous relation with said first sheet to define axial flow channels, at least one of said sheets comprising filter media comprising a web of a plurality of melt-spun fibers of bonded preceramic thermoplastic polymer cured to a cross-linked thermoset polymer and thermally decomposed to ceramic.

2. The high temperature composite ceramic filter according to claim 1 wherein said sheets are formed into a green filter pre-form, including said pleats, said wall segments and said channels, while malleable, and prior to said curing of said thermoplastic polymer to said thermoset polymer.

3. A method for making the high temperature composite ceramic filter of claim 2 comprising melt-spinning a plurality of fibers of preceramic thermoplastic polymer to form one or more layers of nonwoven textile webs of said fibers, providing said first sheet as a planar member from said one or more layers, providing said second sheet from said one or more layers and pleating said second sheet to provide said plurality of pleats defined by said wall segments extending in said zig-zag manner between said pleat tips at said axially extending bend lines, spiral-winding said sheets to a cylindrical filter roll, and then curing said thermoplastic polymer to said thermoset polymer to rigidize said spiral-wound cylindrical filter, and then pyrolizing said spiral-wound cylindrical filter to thermally decompose said thermoset polymer to said ceramic.

4. A method for making a high temperature composite ceramic filter comprising forming a web mat of preceramic thermoplastic polymer fibers by a process selected from the group consisting of a meltblown process and a spunbond process, cutting said web mat into one or more thermoplastic polymer sheets, configuring at least one of said thermoplastic polymer sheets to a desired filter configuration, curing and cross-linking said thermoplastic polymer sheet to a thermoset polymer sheet, thermally decomposing said thermoset polymer sheet to a ceramic sheet while in said filter configuration.

5. The method according to claim 4 comprising performing said curing and cross-linking step after said step of configuring at least one of said thermoplastic polymer sheets to said desired filter configuration.

6. A method for making a high temperature composite ceramic filter comprising forming multiple layers of web mats of preceramic thermoplastic polymer fibers by a process selected from the group consisting of a meltblown process and a spunbond process, cutting said multiple layers of web mats into one or more thermoplastic polymer sheets each having said multiple layers of web mats, configuring at least one of said thermoplastic polymer sheets of multiple layers of web mats to a desired filter configuration, curing and cross-linking said thermoplastic polymer sheet of multiple layers of web mats to a thermoset polymer sheet, thermally decomposing said thermoset polymer sheet to a ceramic sheet while in said filter configuration.

7. The method according to claim 6 comprising forming said multiple layers of web mats of meltblown layers without spunbond layers.

8. The method according to claim 6 comprising forming said multiple layers of web mats of spunbond layers without meltblown layers.

9. The method according to claim 6 comprising performing said curing and cross-linking step after said step of configuring at least one of said thermoplastic polymer sheets of multiple layers of web mats to said desired filter configuration.

10. A method for making a high temperature composite ceramic gradient filter comprising forming multiple layers of web mats comprising forming a first web mat of preceramic thermoplastic polymer fibers of a first diameter by a process selected from the group consisting of a meltblown process and a spunbound process, forming a second web mat of preceramic thermoplastic polymer fibers of a second diameter by a process selected from the group consisting of a meltblown process and a spunbond process, said second diameter being different than said first diameter, cutting said multiple layers of of web mats including said first web mat of preceramic thermoplastic polymer fibers of said first diameter and said second web mat of preceramic thermoplastic polymer fibers of said second diameter, curing and cross-linking said thermoplastic polymer sheet of multiple layers of web mats to a thermoset polymer sheet, thermally decomposing said thermoset polymer sheet to a ceramic sheet while in said filter configuration to provide said gradient filter.

* * * * *